W. VANDERZIEL & J. T. GOODALL.
COIN CONTROLLED. WEIGHING MECHANISM.
APPLICATION FILED OCT. 24, 1911.
1,153,650.
Patented Sept. 14, 1915.
4 SHEETS—SHEET 1.
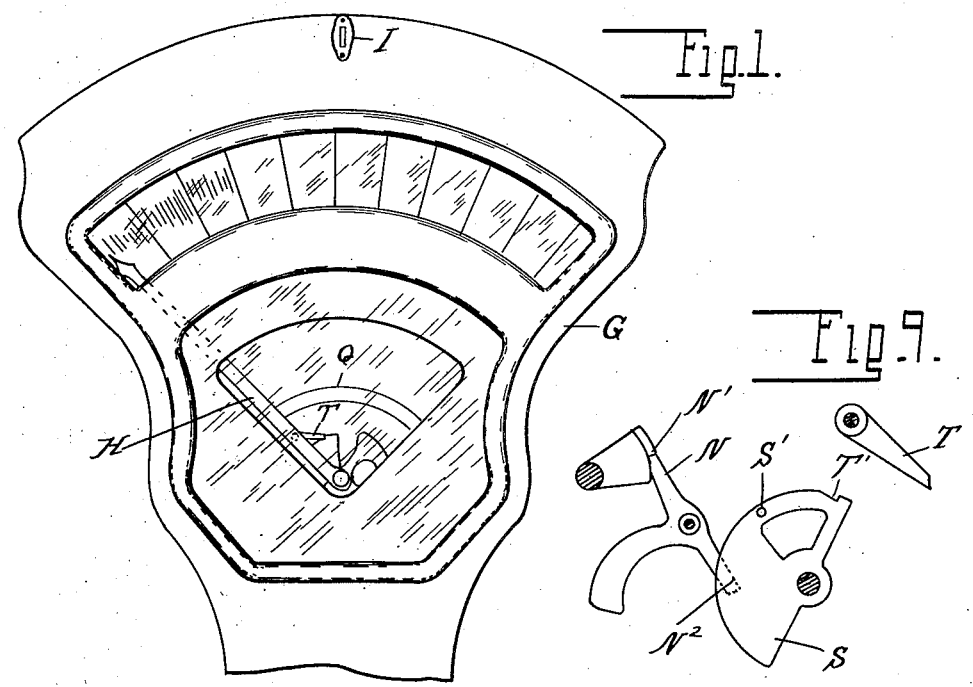
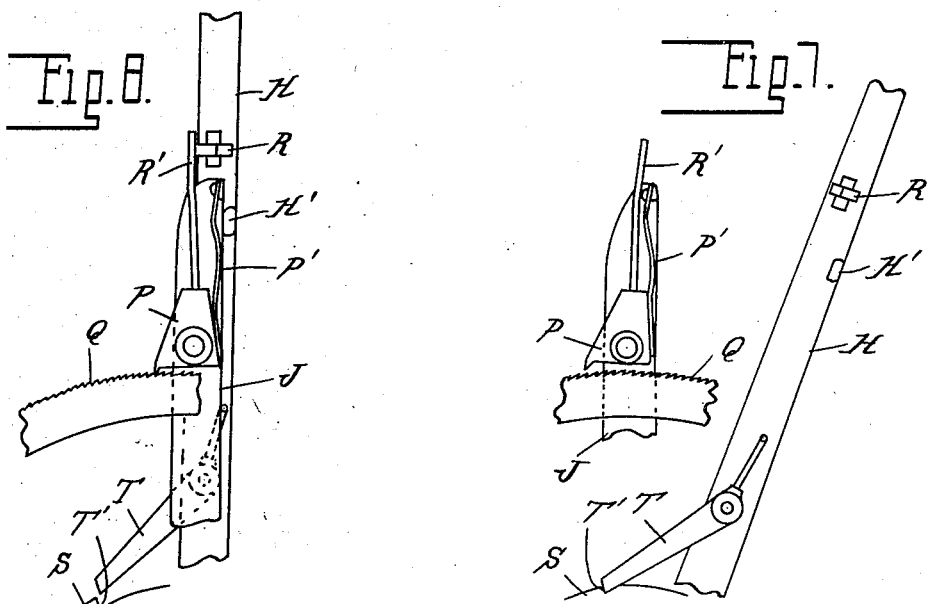
Witnesses
Inventors
William Vanderziel &
John Truman Goodall.
By Whittemore Hulbert & Whittemore
Att'ys

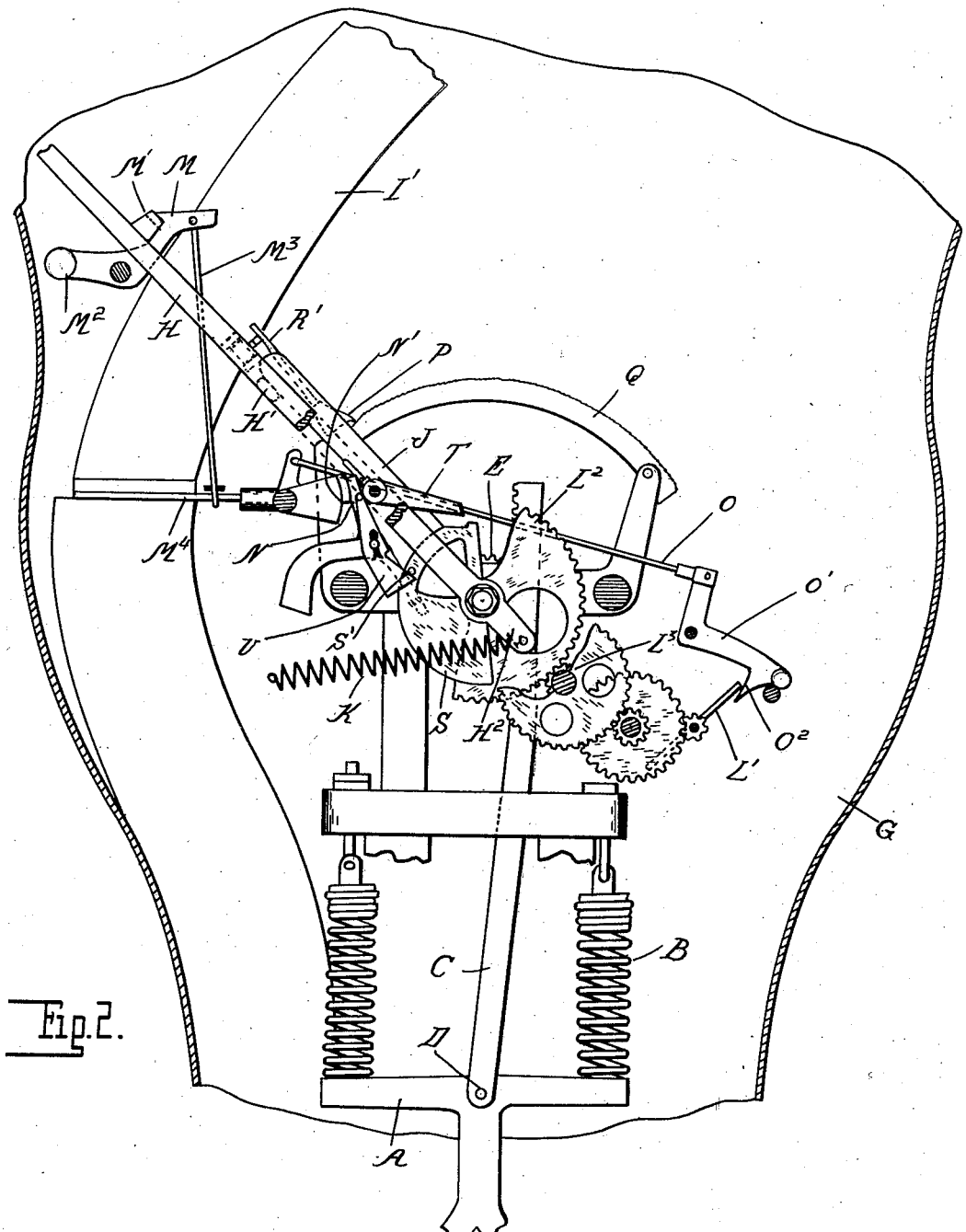

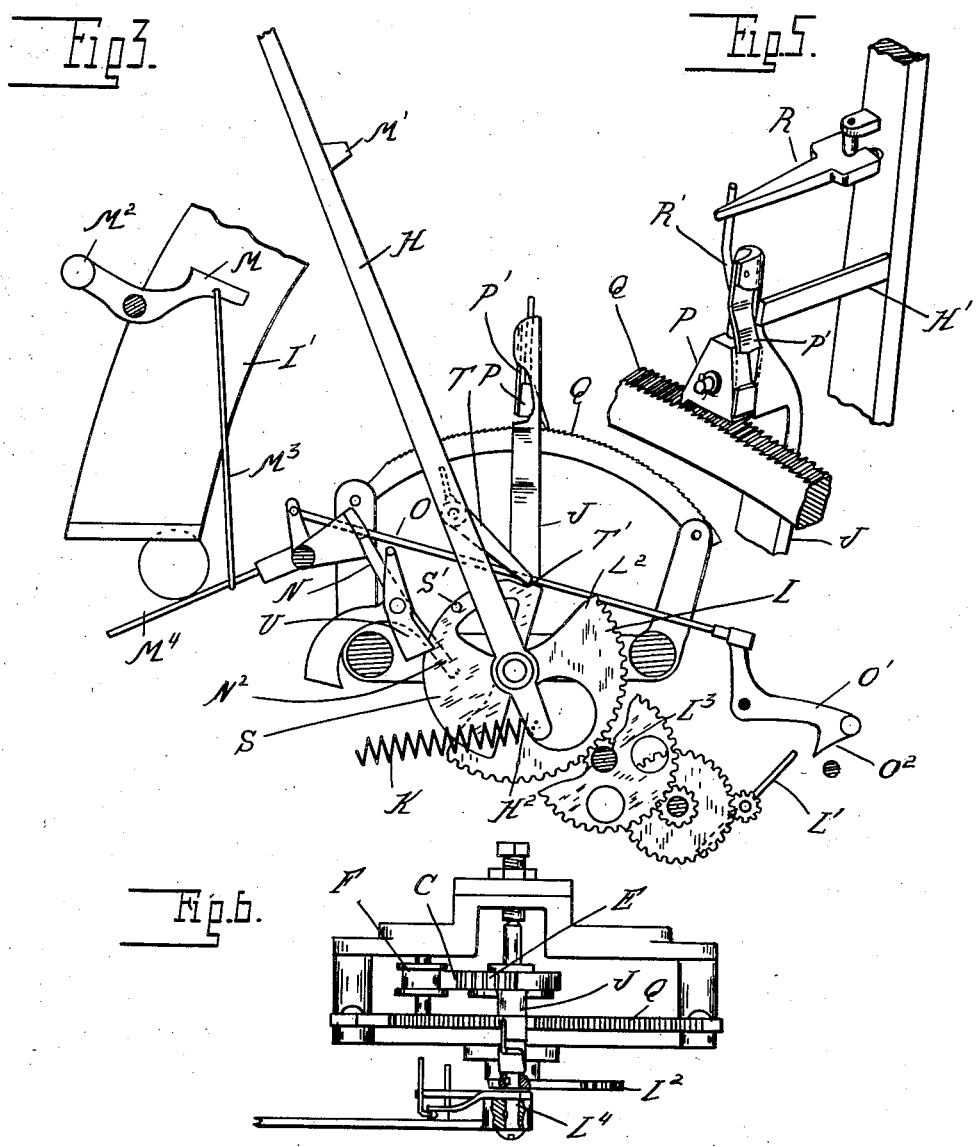

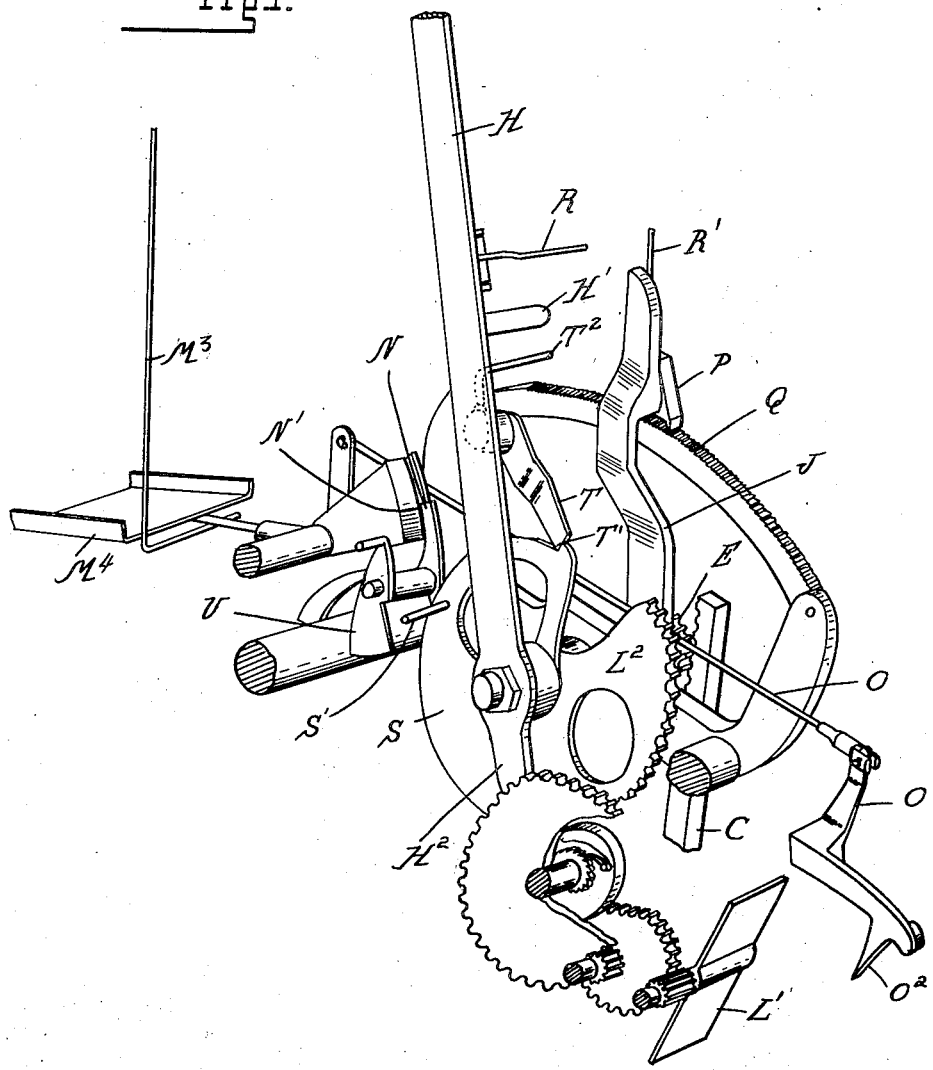

UNITED STATES PATENT OFFICE.

WILLIAM VANDERZIEL AND JOHN TRUEMAN GOODALL, OF DETROIT, MICHIGAN, ASSIGNORS TO THE CAILLE BROTHERS COMPANY, OF DETROIT, MICHIGAN, A CORPORATION OF MICHIGAN.

COIN-CONTROLLED WEIGHING MECHANISM.

1,153,650.  Specification of Letters Patent.  Patented Sept. 14, 1915.

Application filed October 24, 1911. Serial No. 656,513.

*To all whom it may concern:*

Be it known that we, WILLIAM VANDERZIEL and JOHN TRUEMAN GOODALL, both citizens of the United States of America, residing at Detroit, in the county of Wayne and State of Michigan, have invented certain new and useful Improvements in Coin-Controlled Weighing Mechanisms, of which the following is a specification, reference being had therein to the accompanying drawings.

The invention relates to weighing machines of that type in which weight indicating mechanism is released for operation by a coin.

It is the object of the invention first to obtain a construction in which the machine may be operated by a coin whether it is placed in the slot in advance of or subsequent to the placing of the weight on the platform.

It is a further object to obtain a construction of mechanism in which the use of springs is largely avoided, thereby eliminating a factor of uncertainty common to many constructions heretofore devised.

Still further, it is an object to simplify the construction and render it more positive and accurate in its operation.

With these objects in view the invention consists in the construction as hereinafter set forth.

In the drawings, Figure 1 is an elevation of the machine; Fig. 2 is a sectional front elevation of the mechanism with the case shown in section; Fig. 3 is a similar view showing the parts during operation; Fig. 4 is a perspective view thereof; Fig. 5 is a perspective view of the indicator locking mechanism; Fig. 6 is a plan view of a portion of the frame; Figs. 7, 8 and 9 are diagrammatic elevations illustrating the sequence of operation.

Generally described, the machine comprises a suitable casing having a weighing platform (not shown) and an operating standard through which the steelyard rod from the weighing levers pass and is connected at its upper end through the medium of a cross head A with the weighing spring B. C is a rack bar pivotally secured at D to the cross head A and engaging a pinion E with which it is held in mesh by an anti-friction guide roll F. These parts are all of well known and usual construction and form no part of the present invention.

The weight indicating mechanism is located in a head G of the casing and comprises a suitable indicating scale G and an index hand H movable over said scale into a position corresponding to the weight on the platform. This index hand is however, normally locked from operation and is only released after the coin has been inserted in the coin slot I which controls mechanism now to be described.

The rack bar C when actuated by a weight upon the platform of the scale will cause the rotation of the pinion E until the weight is balanced by the increased tension of the spring B. The axis of rotation of this pinion is preferably in alinement with the axis of the index H but there is no direct connection between these parts.

J is a stop arm connected to the pinion E and H' is a finger of the index H which extends laterally to overlap the arm J. Thus when the arm J is moved to various positions of adjustment by varying weights on the platform it will form a stop in the path of the finger H' on the index H limiting the movement of said index to a position corresponding to that of the stop arm J.

The movement of the index is effected by an independent motive power preferably a spring K which is connected to a downward extension H² of the index H and is anchored at a suitable point to the frame. This spring is under sufficient tension to cause the index to follow the stop arm J, but such movement is not permitted until the mechanism is unlocked by the insertion of a coin. Furthermore, to prevent the sudden operation of the index when released and which would cause it to impinge with suitable force against the stop, an escapement mechanism is provided comprising a gear train L terminating in the retarding fan L'. The first gear L² of this train is directly coupled by the shaft L⁴ with the index H and drives the remaining gears through the medium of a ratchet L³ which permits the return movement of the index and gear L without movement of the train.

The locking mechanism which prevents movement of the index comprises a catch M pivotally secured to the frame and engaging a lug M' projecting from the index H. This catch has a gravity arm M² for holding it normally in engagement with the lug M' and is further provided with an actuating connection consisting of a rod M³ attached to the pivoted member M⁴ extending in the path of the coin which falls from the enterance slot I through a suitable chute I'. Thus the impact of the coin against the member M⁴ will rock said member, and through the medium of the rod M³ will disengage the catch from the lug M'. When thus disengaged, reëngagement is prevented by a gravity dog N which drops into engagement with a notched segment N' connected to the pivoted member M⁴ and temporarily holds the latter from returning. The pivoted member M⁴ is connected through a rod O with a rockable member O' having a stop O² normally in the path of the fan L' and locking the gear train L from movement. The arrangement is such that simultaneously with the disengagement of the catch M the stop O² is withdrawn from the fan plane L' so as to permit the movement of the gear train under the actuating force of the spring K.

The stop arm J as has been stated will be directly actuated by the rock bar and pinion when the weight is upon the platform, and will assume a position corresponding to the weight. It is necessary however, to lock this arm before it can operate satisfactorily as a stop for the index for the reason that the inertia of the latter even when retarded by the gear train and the fan, is sufficient to displace the stop arm. This locking is effected by a locking dog P pivotally secured to the arm J and traveling in proximity to a notched or serrated segment Q. Normally the dog is held from engagement with the segment by a spring P' but when the index H has traveled to a position where the lateral arm H' is almost in contact with the stop arm J a projecting finger R on the index H strikes a finger R' on the dog P, rocking the latter against the tension of the spring P' into engagement with the notched segment. This engagement continues until after the complete return of the index preventing any further operation of the scale.

From the description thus far given it will be understood that whenever a coin is placed in the slot and drops through the chute the indicating mechanism is unlocked and is free to follow up the stop arm J. It is necessary however, to prevent successive operations of the machine after being once unlocked, and to this end means is provided for disengaging the gravity dog N from the notched segment N'. This is accomplished without the use of springs by a gravity actuated member S which is pivotally mounted upon the shaft L⁴ and carries a pin S' for striking against an arm N² of the gravity dog N, whereby the latter is disengaged from the notched segment N'. The member S is first lifted by a pawl T carried by the index H and which engages a notched bearing T' in said member S and rotates the latter. Just before the arm H' contacts with the stop arm J, a bent arm T² on the pawl T striking against the index J will rock said pawl out of engagement with the notched bearing therefor, permitting the member S to rotate by gravity until the pin S' strikes the arm N³ and withdraws the dog N from engagement with the notched segment N'. This permits the gravity arm N² and latch M to return the latter, re-locking the index and moving the stop O² in the path of the fan in the escapement train. The dog N after being disengaged from the notched segment N' must be free to reëngage upon a succeeding operation of the machine. For this purpose a lever U is pivoted adjacent to the dog N and has one arm projecting into the path of the index while an opposite arm engages with the pin S' and slightly rocks the pivoted member S. The movement is sufficient to withdraw the pin S' from contact with the arm N², thereby freeing the dog N to again engage with the notched segment N' when another coin is placed in the chute.

In the use of the machine the operator may either place the weight upon the platform in advance of placing the coin in the slot, or he may first place the coin in the slot and then the weight on the platform. In each case the coin passing through the chute I' will impinge against the pivoted member M⁴, rocking the latter and through the rod M³ disengaging the latch M from the lug M'. The gravity dog N then engages with the notched segment N' holding the member M⁴ from return movement and freeing both the index and the escapement mechanism. If the weight has previously been placed on the platform, the stop arm J will have been moved and the index will be immediately actuated by the spring K until arrested by the stop arm. On the other hand if the weight is placed on the platform subsequently, the stop arm J will then be actuated and the index will follow along after the stop arm. Before the index is arrested by the stop arm the latter is firmly locked by the finger R engaging the finger R' and rocking the dog P into engagement with the notched segment Q. This holds the stop arm from any movement under the impact of the index arm. The pawl T is also disengaged from the member S, the latter actuated by gravity is returned to normal position where the pin S' in striking the arm N² releases the dog N from the notched segment N' and permits the return of the latch M and stop O².

It will be noted that the mechanism is free from springs with the exception of the weighing springs, the spring K for actuating the index, and the spring P' for returning the dog P. The dog N and latch M are both gravity actuated as is also the stop O² and the member S which disengages the dog N. Thus there is nothing to get out of order in the successive actuation of the machine, and the operation is much more positive than with mechanism having numerous spring actuated parts.

What I claim as my invention is:

1. The combination with weighing mechanism, of a stop arm positioned thereby, an independently operated index limited in its movement by said stop arm, a notched segment adjacent to said stop arm, a dog carried by said stop arm for engaging said notched segment normally held in released position, and means on said index operating in advance of the impact thereof against said stop arm for engaging said dog with said notched segment.

2. The combination with weighing mechanism, of a rockable stop arm positioned thereby, a segment adjacent to said stop arm, a dog carried by said stop arm for engaging said segment but normally free therefrom, an independently operated index limited in its movement by said stop arm, and means on said index operating in advance of the impact against said stop arm for engaging said dog with said segment.

3. The combination with weighing mechanism, of a rockable stop arm positioned thereby, a segment adjacent to said stop arm, a dog carried by said stop arm for engaging said segment, means for normally holding said dog from engagement, an independently operated index limited in its movement by said stop arm, and means carried by said index for causing the engagement of said dog with said segment in advance of the impact of said index against said stop arm.

4. The combination with weighing mechanism, of a rockable stop arm positioned thereby, a notched segment adjacent to said stop arm, a dog carried by said stop arm rockable into engagement with said notched segment, a spring for holding said dog normally out of engagement with said segment, an independently operated index limited in its movement by said stop arm, and means operating in advance of the contact of said index with said stop arm for engaging said dog with said segment and maintaining the engagement thereof until the parts are restored to normal position.

5. The combination with weighing mechanism, of a rockable stop arm positioned thereby, an independently operated index limited in its movement by said stop arm, a gravity actuated latch for holding said index from movement, means operated by the impact of a coin for releasing said gravity latch, a second gravity latch for holding the first mentioned gravity latch from reëngagement, and a gravity actuated means elevated by said index and released upon the registration of said index with said stop arm, said gravity actuated means releasing said second gravity latch.

6. The combination with weighing mechanism, of a rockable stop arm positioned thereby, an independently operated index limited in its movement by said stop arm, a gravity latch for locking said index from movement, means operated by the impact of a coin for releasing said gravity latch, a second gravity latch for locking said first mentioned gravity latch from reëngagement, a gravity actuated impact member for releasing said second gravity latch, means operated by said index for lifting said gravity impact member, and means for freeing said gravity impact member upon the registration of said index with said stop arm.

7. The combination with weighing mechanism, of a stop arm positioned thereby, an independently operated index limited in its movement by said stop arm, a gravity latch for holding said index from movement, means operated by the impact of a coin for releasing said gravity latch, a second gravity latch for holding said first gravity latch from reëngagement, a gravity actuated impact device for releasing said second gravity latch, a pawl carried by said index for engaging said gravity impact device and lifting the same during the movement of said index, and means operated upon the registration of said index with said stop arm for disengaging said pawl.

8. The combination with weighing mechanism, of a stop arm positioned thereby, an index limited in its movement by said stop arm, an independent motor for operating said index, an escapement mechanism for retarding the movement of said index, a gravity latch for locking said index, a stop for arresting said escapement mechanism, means actuated by the impact of a coin for simultaneously disengaging said gravity latch and withdrawing said stop for the escapement mechanism, a gravity latch for holding said first mentioned gravity latch and stop in released position, a gravity actuated impact device for disengaging said second gravity latch, a pawl carried by said index for engaging said gravity impact device to lift the same upon the movement of said index, and means operating upon the registration of said index with said stop arm for disengaging said pawl.

9. The combination with weighing mechanism, of a stop arm positioned thereby, an independently operated index limited in its movement by said stop arm, and means carried by said stop arm and operated by said index in advance of the impact thereof against said stop arm for locking the latter.

10. The combination with weighing mechanism, of a rockable stop arm positioned thereby, an independently operated index limited in its movement by said stop arm, a catch for said index, an escapement mechanism actuated by said index for retarding the movement thereof, a stop for said escapement mechanism, and means for simultaneously releasing said index from its catch and said escapement mechanism from its stop.

In testimony whereof we affix our signatures in presence of two witnesses.

WILLIAM VANDERZIEL.
JOHN TRUEMAN GOODALL.

Witnesses:
A. ARTHUR CIELL,
CLARA C. GLUNZ.